US012264692B2

(12) United States Patent
He et al.

(10) Patent No.: US 12,264,692 B2
(45) Date of Patent: Apr. 1, 2025

(54) METHOD AND DEVICE FOR DETECTING POSITION OF PISTON ROD, HYDRAULIC CYLINDER AND WORKING MACHINE

(71) Applicant: SANY AUTOMOBILE MANUFACTURING CO., LTD., Changsha (CN)

(72) Inventors: Dian He, Changsha (CN); Zhou Xu, Changsha (CN); Zhixue Lu, Changsha (CN)

(73) Assignee: SANY AUTOMOBILE MANUFACTURING CO., LTD., Changsha (CN)

( * ) Notice: Subject to any disclaimer, the term of this patent is extended or adjusted under 35 U.S.C. 154(b) by 0 days.

(21) Appl. No.: 18/472,527

(22) Filed: Sep. 22, 2023

(65) Prior Publication Data
US 2024/0011513 A1    Jan. 11, 2024

Related U.S. Application Data

(63) Continuation of application No. PCT/CN2021/103600, filed on Jun. 30, 2021.

(30) Foreign Application Priority Data

Mar. 31, 2021 (CN) .......................... 202110351672.7

(51) Int. Cl.
    *F15B 15/28*    (2006.01)
(52) U.S. Cl.
    CPC ...... *F15B 15/2846* (2013.01); *F15B 15/2876* (2013.01)
(58) Field of Classification Search
    CPC .......................... F15B 15/2846; F15B 15/2876
    See application file for complete search history.

(56) References Cited

U.S. PATENT DOCUMENTS 6,327,791 B1    12/2001   Norcross et al.
6,452,158 B1 *   9/2002   Whatley ............. F15B 15/2876
                                                            356/617
(Continued)

FOREIGN PATENT DOCUMENTS

CN    105473873 A    4/2016
CN    108775862 A    11/2018
(Continued)

OTHER PUBLICATIONS

First Office Action issued in counterpart Chinese Patent Application No. 202110351672.7, dated Feb. 15, 2023.
(Continued)

*Primary Examiner* — Michael Leslie
(74) *Attorney, Agent, or Firm* — Westbridge IP LLC

(57) ABSTRACT

Disclosed are a method and a device for detecting a position of a piston rod, a hydraulic cylinder and a working machine. The method includes: acquiring a target image at a target position; obtaining a pixel information corresponding to the target image; comparing the pixel information with a pixel database of the piston rod, a full-stroke pixel information of the piston rod and a relationship between the full-stroke pixel information of the piston rod and a displacement of the piston rod are stored in the pixel database of the piston rod, and the full-stroke pixel information at least comprises the pixel information within a range in which the piston rod is configured to move relative to the target position; and determining a position information of the piston rod based on a comparison result.

9 Claims, 5 Drawing Sheets

(56) References Cited

U.S. PATENT DOCUMENTS

| | | | |
|---|---|---|---|
| 8,482,607 B2 | 7/2013 | Webster et al. | |
| 10,060,453 B2* | 8/2018 | Maglione | F15B 15/2876 |
| 10,094,397 B2* | 10/2018 | Schwab | F15B 15/1457 |
| 10,365,370 B2* | 7/2019 | Webster | G01B 11/002 |
| 10,663,323 B2* | 5/2020 | Battisti | G01D 5/34746 |
| 2017/0074296 A1 | 3/2017 | Schwab et al. | |
| 2018/0120437 A1 | 5/2018 | Webster et al. | |
| 2018/0266853 A1 | 9/2018 | Battisti et al. | |
| 2023/0217121 A1* | 7/2023 | Kato | H04N 23/95 |
| | | | 348/234 |

FOREIGN PATENT DOCUMENTS

| | | | |
|---|---|---|---|
| CN | 110067785 A | 7/2019 | |
| CN | 111322953 A | 6/2020 | |
| CN | 112128176 A | 12/2020 | |
| CN | 112560774 A | 3/2021 | |
| DE | 20220387 U1 | 7/2003 | |

OTHER PUBLICATIONS

Grant Notification issued in counterpart Chinese Patent Application No. 202110351672.7, dated Jun. 30, 2023.
International Search Report and Written Opinion issued in corresponding PCT Application No. PCT/CN2021/103600, dated Oct. 9, 2021.
Extended European Search Report issued in counterpart European Patent Application No. 21934298.7, dated Feb. 17, 2025.

* cited by examiner

METHOD AND DEVICE FOR DETECTING POSITION OF PISTON ROD, HYDRAULIC CYLINDER AND WORKING MACHINE

CROSS-REFERENCE TO RELATED APPLICATIONS

This application is a continuation application of International Application No. PCT/CN2021/103600, filed on Jun. 30, 2021, which claims priority to Chinese Patent Application No. 202110351672.7, filed on Mar. 31, 2021. The above-mentioned applications are incorporated herein by reference in their entireties.

TECHNICAL FIELD

The present application relates to the field of hydraulic technology, and in particular to a method and a device for detecting a position of a piston rod, a hydraulic cylinder and a working machine.

BACKGROUND

The hydraulic cylinder, as the actuator of the hydraulic system, is widely used in various construction machinery mechanisms. With the diversification of customer needs and the improvement of control accuracy requirements, the detection and control accuracy of the displacement of the hydraulic cylinder piston rod also need to be continuously improved.

In the related art, the position of the piston rod is usually detected through a magnetostrictive displacement sensor, but the detection range of this method is narrow and the detection accuracy is limited; or the position of the piston rod is detected through a built-in wire rope displacement sensor, but this kind of sensor is relatively troublesome to install and maintain, and the longer the stroke, the higher the price. The wire rope also has problems such as slippage and zero-point drift, which affects the stability of the position detection.

SUMMARY

The present application provides a method and a device for detecting a position of a piston rod, a hydraulic cylinder and a working machine, aiming to improve the detection accuracy and efficiency of the position of the piston rod and overcome the problems of low detection accuracy and high detection cost in the related art.

The present application provides a method for detecting a position of a piston rod, and the piston rod is movably installed on a cylinder body. The method includes:
acquiring a target image at a target position;
obtaining a pixel information corresponding to the target image;
comparing the pixel information with a pixel database of the piston rod, a full-stroke pixel information of the piston rod and a relationship between the full-stroke pixel information of the piston rod and a displacement of the piston rod are stored in the pixel database of the piston rod, and the full-stroke pixel information at least includes the pixel information within a range in which the piston rod is configured to move relative to the target position; and
determining a position information of the piston rod based on a comparison result.

In an embodiment, the piston rod is provided with a plurality of coding units along a moving direction, the plurality of the coding units are provided in sequence on the piston rod and are different from each other, and the target image includes at least one coding unit on the piston rod; and
before comparing the pixel information with the pixel database of the piston rod, the method further includes:
determining a target coding feature segment from a coding feature database based on the coding unit of the target image, the coding feature database includes coding feature segments corresponding to all the coding units on the piston rod, and each of the coding feature segments in the coding feature database is mapped to the pixel information of the pixel database of the piston rod; and
obtaining a corresponding target pixel information in the pixel database of the piston rod based on the target coding feature segment.

In an embodiment, comparing the pixel information with the pixel database of the piston rod includes:
comparing the pixel information corresponding to the target image with the target pixel information and the pixel information on at least one side of both sides of the target pixel information.

In an embodiment, determining the target coding feature segment from the coding feature database based on the coding unit of the target image includes:
identifying a coding unit of the target image;
searching a first coding unit corresponding to the coding unit of the target image from the coding feature database based on the coding unit of the target image; and
determining the target coding feature segment based on a position of the first coding unit on the coding feature database.

In an embodiment, the target coding feature segment includes a target interval corresponding to the target coding feature segment and supplementary intervals located on both sides of the target interval.

In an embodiment, two adjacent coding units are spaced apart along the moving direction of the piston rod, and each of the coding units includes a same start code and a same number of feature codes.

In an embodiment, a plurality of feature codes are spaced apart along the moving direction of the piston rod, and each of the coding units includes a same number of feature codes starting from any one feature code and distributed towards a target direction.

The present application also provides a device for detecting a position of a piston rod, including:
an acquiring module configured to acquire a target image at a target position;
an obtaining module configured to obtain a pixel information corresponding to the target image;
a positioning module configured to compare the pixel information with a pixel database of the piston rod, a full-stroke pixel information of the piston rod, a corresponding relationship between the full-stroke pixel information of the piston rod and a displacement of the piston rod are stored in the pixel database of the piston rod, and the full-stroke pixel information at least includes the pixel information within a range in which the piston rod can move relative to the target position; and
a detecting module configured to determine a position information of the piston rod based on a comparison result.

In an embodiment, the piston rod is provided with a plurality of coding units along a moving direction, and the plurality of the coding units are provided in sequence on the piston rod and are different from each other, and the target image includes at least one coding unit on the piston rod; and the device further includes a second acquiring module configured to determine a target coding feature segment from a coding feature database based on the coding unit of the target image, the coding feature database includes the coding feature segment corresponding to all the coding units on the piston rod, and each of the coding feature segments in the coding feature database is mapped to the pixel information of the pixel database of the piston rod; and the second acquiring module is configured to acquire a corresponding target pixel information in the pixel database of the piston rod based on the target coding feature segment.

The present application also provides a hydraulic cylinder, including:

a cylinder body;

a piston rod movably provided on the cylinder body; and the device for detecting the position of the piston rod.

The present application also provides a working machine, including the hydraulic cylinder or the device for detecting the position of the piston rod.

The present application also provides an electronic device, including a memory, a processor and a computer program stored on the memory and executable on the processor, when the program is executed by the processor, the method for detecting the position of the piston rod is implemented. The present application provides a method and a device for detecting a position of a piston rod, a hydraulic cylinder and a working machine. The detection method determines the position information of the piston rod by comparing the pixel information of the target image with the pixel database of the piston rod. The accurate comparison of the pixel information of the pixel database of the piston rod improves the detection accuracy of the position of the piston rod and realizes the detection of the absolute displacement of the piston rod.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

A method for detecting a position of a piston rod of the present application is described below with reference to FIG. 1 to FIG. 6. An execution subject of the method may be a detection device of a hydraulic cylinder or a controller of a working machine where the hydraulic cylinder is located.

This method is configured to detect the position of the piston rod in the hydraulic cylinder, and the piston rod 530 is movably installed on the cylinder body, which includes a cylinder main body 510 and a cylinder cover 520.

Figure 1:
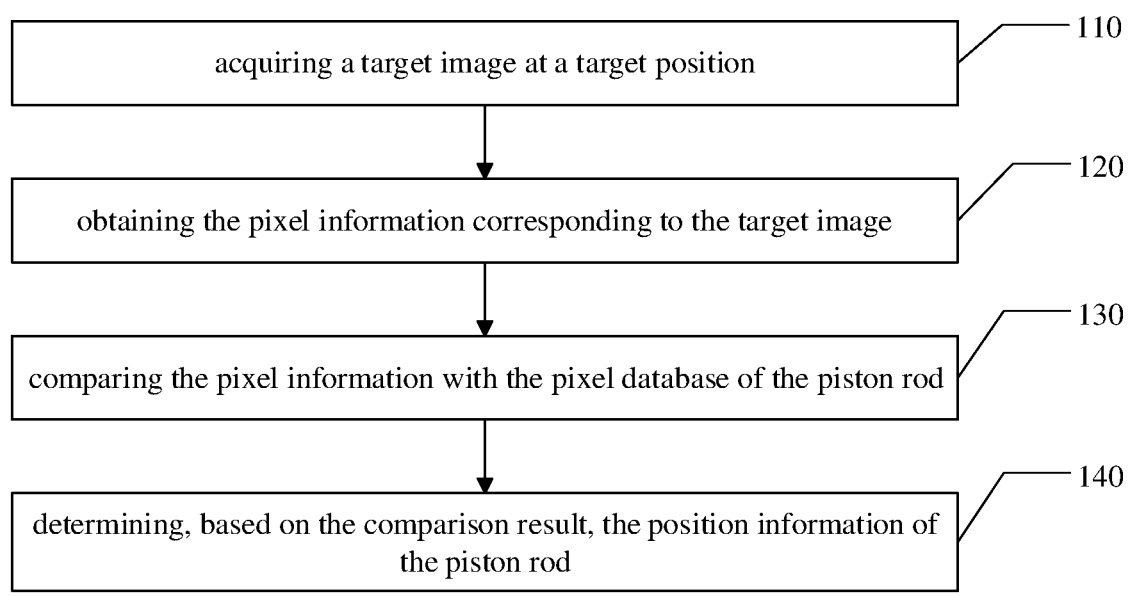
FIG. 1 is a schematic flowchart of a method for detecting a position of a piston rod according to an embodiment of the present application.

The method for detecting the position of the piston rod provided by the present application, as shown in FIG. 1, includes: steps 110 to 140.

Step 110: acquiring a target image 620 at a target position 610.

The target position 610 is relatively stationary to the cylinder body, and the target image 620 acquired at the target position 610 is an image on the piston rod 530.

During a movement of the piston rod 530, when it reaches different displacements, the target image 620 exposed at the target position 610 is different.

By setting different images within the full range of the piston rod 530, a corresponding relationship between the position information of the piston rod 530 and the target image 620 is formed.

Step 120: obtaining the pixel information corresponding to the target image 620.

The target images 620 are different when the piston rod 530 moves to different displacements, accordingly, the pixel information in the target images 620 are also different.

The pixel information of the target image 620 has a unique correspondence with the displacement information of the piston rod 530, and can be obtained through computer software or programs.

The pixel information corresponding to the target image 620 may include a coordinate information and a pixel value of the pixel points. When comparing, the mapping relationship of the coordinate information of the pixel points between the two images may be obtained based on the comparison of the pixel values of a plurality of pixel points between the two images.

In reality, if the pixel values of the target number of pixels at the associated positions between the two images are equal or within an error range, the mapping relationship of the coordinate information of the pixels between the two images can be determined.

Step 130: comparing the pixel information with the pixel database of the piston rod.

Figure 2:
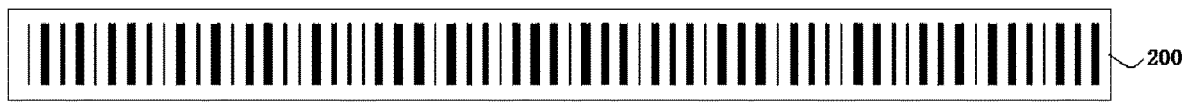
FIG. 2 is a schematic view of a coding unit of the method for detecting the position of the piston rod according to an embodiment of the present application.

As shown in FIG. 2, a full-stroke pixel information 200 of the piston rod 530 and a corresponding relationship between the full-stroke pixel information 200 of the piston rod 530 and the displacement of the piston rod 530 are stored in the pixel database of the piston rod.

The full-stroke pixel information 200 of the piston rod 530 includes the corresponding pixel information of the target image 620 when the piston rod 530 reaches different displacements.

The pixel database of the piston rod is pre-established before the position of the piston rod 530 is detected. After the establishment is completed, it can be stored in the memory or the cloud.

The pixel database of the piston rod is established through the pixel information of the target image 620 obtained when the piston rod 530 moves and the corresponding position information.

The full-stroke pixel information 200 in the pixel database of the piston rod at least includes the pixel information within a movable range of the piston rod 530 relative to the target position 610.

Step 140: determining, based on the comparison result, the position information of the piston rod 530.

The pixel information of the target image 620 represents a real-time position of the piston rod 530, and the pixel database of the piston rod is a pixel information database at different positions within the full-stroke of the piston rod 530.

The pixel information of the target image 620 is compared with the pixel database of the piston rod, and the pixel information consistent with the pixel information of the target image 620 is found in the pixel database of the piston rod.

By comparing the pixel information of the target image 620 with the pixel database of the piston rod, the real-time position of the piston rod 530 can be accurately located.

In reality, if the pixel values of the target number of pixels at the associated positions between the two images are equal or within the error range, the mapping relationship of the coordinate information of the pixels between the two images can be determined. Since the positional relationship between the pixel points in the pixel database of the piston rod and the piston rod 530 is determined, the real-time position of the piston rod 530 corresponding to the target image 620 can be obtained.

The method for detecting the position of the piston rod of the present application acquires the target image when the piston rod is at the target position, compares the pixel information of the target image with the pixel database of the piston rod, and determines the position information of the piston rod. The accurate comparison of the target image and the pixel information of the pixel database of the piston rod improves the detection accuracy of the position of the piston rod and realizes the detection of the absolute displacement of the piston rod.

In an embodiment, the piston rod 530 is provided with a plurality of coding units along a moving direction. The plurality of coding units are sequentially arranged on the piston rod 530, and are arranged differently from each other. The target image 620 includes at least one coding unit on the piston rod 530. In this embodiment, the coding unit can be further configured to assist in determining the pixel information, especially the possible corresponding coding feature segments can be queried from the pixel database of the piston rod.

For different types of hydraulic cylinders, the plurality of coding units are arranged in different ways:

Firstly, for telescopic hydraulic cylinders.

The piston rod 530 telescopically moves in the hydraulic cylinder, and the piston rod 530 is provided with a plurality of coding units along a telescopic moving direction, that is, the plurality of coding units are arranged in an axial direction of the piston rod 530.

Secondly, for rotary hydraulic cylinders.

The piston rod 530 rotates in the hydraulic cylinder, and the piston rod 530 is provided with a plurality of coding units along a rotation direction, that is, the plurality of coding units are arranged in a circumferential direction of the piston rod 530.

The plurality of coding units arranged along the moving direction can be firmly arranged on the piston rod 530 by engraving, laser etching or pasting.

The shape, type and number of each code in the plurality of coding units can be adjusted according to the shape of the piston rod 530 and detection requirements.

The shape of each code included in the coding unit may be a strip, a triangle, a pentagon or other shapes.

In an embodiment, as shown in FIG. 2, the shape of each code in the plurality of coding units may be a long strip. In other words, the code may be a barcode.

Each coding unit may include a plurality of barcodes. By designing different barcode widths, a uniqueness of the corresponding position of the coding unit can be achieved. The plurality of barcode coding units may be arranged in the piston rod 530 of the telescopic hydraulic cylinder along the axial direction, or may be arranged along the circumference of the piston rod 530 of the rotary hydraulic cylinder.

The coding units on the piston rod 530 correspond to the positions of the piston rod 530. Each of the coding units represents the corresponding position information on the piston rod 530, and each of the coding units is unique.

The target image 620 acquired at the target position 610 on the piston rod 530 includes at least one coding unit on the piston rod 530.

Figure 5:
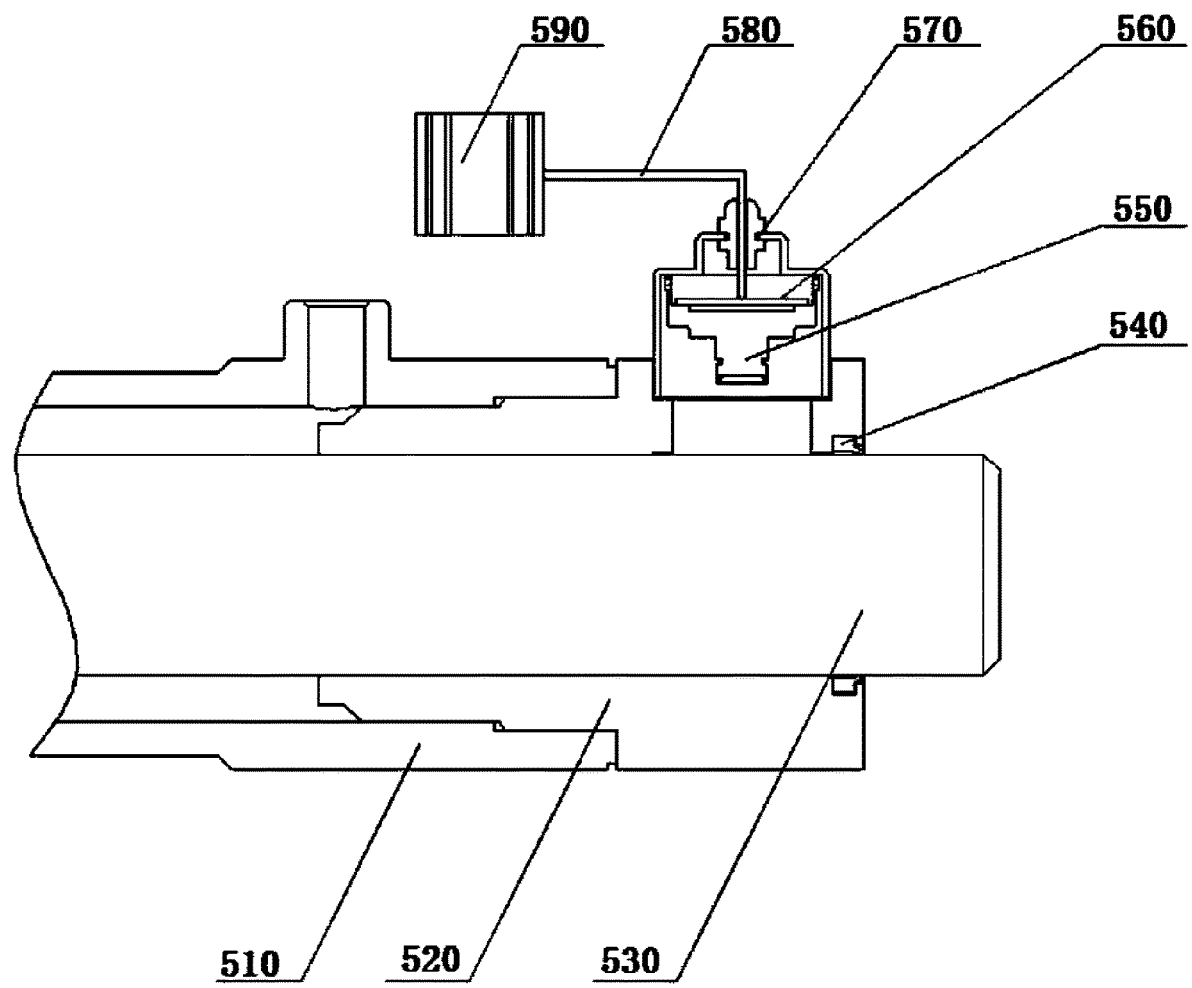
FIG. 5 is a schematic structural view of a hydraulic cylinder according to an embodiment of the present application.
Figure 6:
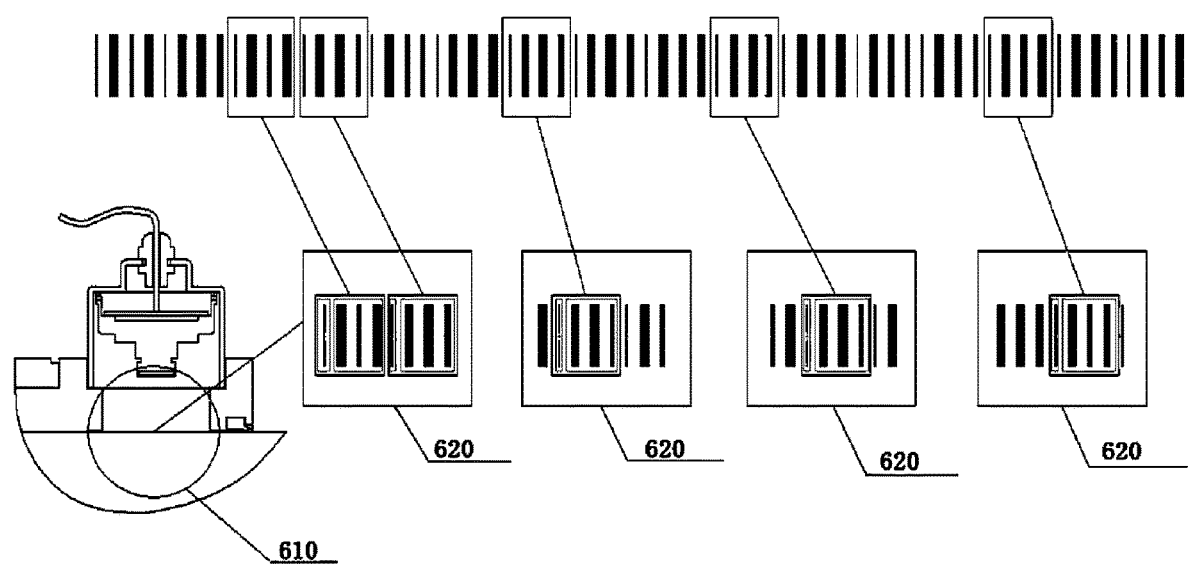
FIG. 6 is a schematic view of a process of detecting the position of the piston rod of the hydraulic rod according to an embodiment of the present application.

Taking the position of the piston rod detection of the telescopic hydraulic cylinder shown in FIG. 5 and FIG. 6 as an example.

A camera 550 configured to collect the target image 620 in the hydraulic cylinder is fixedly installed on A cylinder cover 520, and an installation location is the target position 610.

When the piston rod 530 is moving, the camera 550 captures different target images 620 at different positions of the piston rod 530. The target image 620 is an area on the piston rod 530 where a coding unit group is provided, and can represent the position of the piston rod 530.

In an embodiment, as shown in FIG. 6, the target image 620 acquired at the target position 610 includes at least one coding unit on the piston rod 530. A complete coding unit is read to obtain the position information of the piston rod 530 corresponding to the coding unit.

In a leftmost target image 620 acquired by the hydraulic cylinder shown in FIG. 6, two complete coding units can be read, and one complete coding unit can be read in other three target images 620.

By reading the corresponding coding unit in the target image 620, the unique corresponding position information of the coding unit on the piston rod 530 is quickly obtained.

Of course, the acquisition method of the target image 620 on the piston rod 530 of the rotary hydraulic cylinder is similar and will not be described in detail here.

In an embodiment, before step 130, the method also includes: determining the target coding feature segment from the coding feature database based on the coding unit of the target image 620, and obtaining the corresponding target pixel information in the pixel database of the piston rod based on the target coding feature segment.

The plurality of coding units are provided along the moving direction of the piston rod 530 throughout the piston rod 530, and the full-stroke characteristic coding is formed on the surface of the piston rod 530.

Before detecting the position of the piston rod 530, it is necessary to establish a coding feature database representing the correspondence between the plurality of coding units representing the full-stroke of the piston rod 530 surface and the position information of the piston rod 530.

The coding feature database includes coding feature segments corresponding to all coding units on the piston rod 530, and each of the coding feature segments has a corresponding relationship with the position of the piston rod 530.

The corresponding relationship between the full-stroke pixel information 200 of the piston rod 530 and the displacement of the piston rod 530 is stored in the pixel database of the piston rod.

Each coding feature segment in the coding feature database also has a corresponding relationship with the pixel information of the pixel database of the piston rod.

Each of the coding feature segments in the coding feature database is mapped to the pixel information of the pixel database of the piston rod, which realizes a one-to-one correspondence among coding feature segments, pixel information and piston rod positions.

The coding feature database can be determined in the following ways:

photographing at high-frequency on the coding unit group 200 in the moving direction of the piston rod 530, and capturing the images of the plurality of coding units of the complete piston rod 530 on the piston rod 530.

Identifying the coding units on the captured image of the coding unit group 200 in the full-stroke are, splitting and splicing each of the identified coding units in the full-stroke.

Binary processing on each of the coding units to extract the feature information of the coding unit, and establishing a coding feature database in which each of the coding units corresponds to the position information of the piston rod 530 and every coding unit corresponds to the position information of the piston rod 530 in the full-stroke.

Each of the coding units in the coding feature database has a unique corresponding position of the piston rod 530, and any position of the piston rod 530 also has the corresponding coding unit information.

After the coding feature database is established, it can be stored in the memory or the cloud. When detecting the position of the piston rod 530, it can be directly read from the memory or the cloud for use.

After the coding feature database is established, based on the coding unit on the target image 620, the coding feature segment consistent with the coding unit on the target image 620 is found from the coding feature database, that is, the target coding feature segment, and the position of the piston rod 530 is detected.

In the hydraulic cylinder acquisition target image 620 shown in FIG. 6, the target image 620 contains more than one complete coding unit. The identified coding unit can find the target coding feature segment in the coding feature database, obtain the corresponding target pixel information in the pixel database of the piston rod through the target coding feature segments, thereby obtaining the position information of the piston rod 530.

Based on the identification of the coding unit in the target image 620 and the determination of the target coding feature segment within the position range corresponding to the coding unit, an approximate position of the piston rod 530 can be quickly located.

The corresponding target pixel information in the pixel database of the piston rod obtained according to the target coding feature segment can realize the accurate detection of the position of the piston rod 530.

In an embodiment, the target pixel information corresponding to the coding feature segment is compared with the pixel information of the target image 620 to determine the position information of the piston rod 530. The pixel comparison greatly improves the accuracy of the position detection of the piston rod 530.

By identifying the coding unit in the target image 620 to quickly locate the approximate position of the piston rod 530, the detection efficiency of the piston rod 530 in the process of the position detection is improved, then the target pixel information of the coding feature segment is compared with the pixel information of the target image 620, the accuracy of the position detection of the piston rod 530 is improved, and the detection of the absolute displacement of the piston rod is realized.

It is recorded in the related art that the position of the piston rod is detected by scanning a code, and the position of the piston rod is obtained by adding a product of a number of detected complete barcodes and a length of the complete barcode and the position of a reference complete barcode.

In the related art, the detection accuracy of the position of the piston rod by calculating the barcode compensation value is low, and the detection accuracy of the position of the piston rod is limited by the length of the barcode.

In the present application, the position of the piston rod is obtained through the accurate comparison between the target image and the target coding feature segment. The detected position is not affected by the coding length. The accurate comparison between the target image and the target coding feature segment image improves the detection accuracy of the position of the piston rod.

The present application also performs a rapid positioning by identifying the coding unit to obtain the target coding feature segment, which reduces the time to obtain the approximate position of the piston rod and improves the detection efficiency of the position of the piston rod.

In an embodiment, step 130 includes: comparing the pixel information corresponding to the target image 620 with the target pixel information and the pixel information on at least one side of both sides of the target pixel information.

The comparison range between the pixel information corresponding to the target image 620 and the target pixel information is expanded, and the comparison interval is supplemented within a certain range on at least one side of the both sides of the target pixel information.

Comparing the pixel information corresponding to the target image with the target pixel information, and comparing the pixel information corresponding to the target image with the pixel information on a left side, a right side or both sides of the target pixel information.

Adding the pixel information within the certain range on at least one of the both sides in addition to the target pixel information can ensure a comprehensive comparison between the pixel information corresponding to the target image and the target pixel information, and avoid an inability to find the complete target image in the target pixel information 620 pixel information.

The pixel information within the certain range on both sides besides the target pixel information can be adjusted according to the width of the interval for acquiring the target image 620.

In an embodiment, based on the coding unit of the target image, determining the target coding feature segment from the coding feature database includes: identifying the coding unit of the target image; searching, based on the coding unit of the target image, for a first coding unit corresponding to the coding unit of the target image from the coding feature database; determining, based on the position of the first coding unit on the coding feature database, the target coding feature segment.

Firstly, identifying the target coding unit on the target image 620.

In this step, the coding unit on the target image 620 acquired at the target position 610 is identified, and the recognition result is the coding unit representing the position of the piston rod 530.

For example, the leftmost target image 620 shown in FIG. 6 includes two coding units, and the subsequent three target images 620 include one coding unit.

Different target images 620 correspond to different coding units, representing the position information of different positions of the piston rod 530.

Then, searching, based on the coding unit of the target image 620, for the first coding unit corresponding to the coding unit of the target image 620 from the coding feature database.

The coding feature database includes every coding unit and the corresponding position information thereof. Each of the unique coding unit on the piston rod 530 can find the corresponding unit, that is, the first coding unit, in the coding feature database.

Determining, based on the position of the first coding unit on the coding feature database, the target coding feature segment.

The position information of the piston rod 530 represented by the first coding unit is the approximate position information, and the approximate position information is the position range corresponding to the coding unit of the target image 620, that is, the target coding feature segment.

By identifying the target coding unit in the target image 620 and searching for the first coding unit corresponding to the coding unit in the coding feature database, the target coding feature segment can be quickly determined, and the coding unit recognition speed is fast and the accuracy is high.

In an embodiment, the target coding feature segment includes a target interval corresponding to the target coding feature segment and supplementary intervals located on both sides of the target interval.

The target interval is to identify the position interval corresponding to the target coding feature segment, expand the range of the target coding feature segment, and include the supplementary intervals within the certain range on both sides of the target interval into the range of the target coding feature segment.

For example, the target interval of the target coding feature segment corresponding to the obtained coding unit of the target image 620 of the piston rod 530 has a length of 1 coding unit, which can be expanded to obtain the target coding feature segment of 2 coding unit lengths including the target interval and the supplementary intervals on both sides thereof.

The target coding feature segment includes the target interval and the supplementary intervals on both sides thereof, widening the length of the target coding feature segment to avoid incomplete recognition of the target coding feature segment or incomplete recognition at the beginning and end of the piston rod 530.

In an embodiment, the piston rod 530 is provided with a plurality of coding units along the moving direction and can have a plurality of coding methods.

Two different coding methods are described below.

Coding method 1: A plurality of coding units are provided in the moving direction of the piston rod 530, two adjacent coding units are spaced apart along the moving direction of the piston rod 530, each of the coding units includes a same start code 210 and a same number of feature codes 211.

Figure 3:
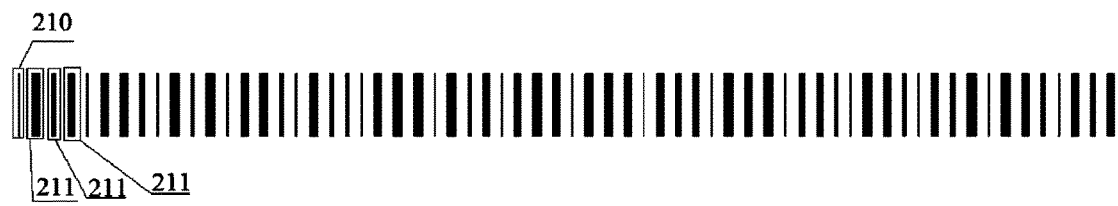
FIG. 3 is a schematic view of a first coding scheme of the method for detecting the position of the piston rod according to an embodiment of the present application.

In an embodiment, as shown in FIG. 3, a surface of the piston rod 530 is provided with a plurality of barcodes with different widths. The plurality of barcodes constitute a plurality of coding units, thus forming the plurality of coding units within the full-stroke range of the piston rod 530.

One fixed-width barcode is used as the start code 210 of the coding unit, and a plurality of feature codes 211 with other widths are freely arranged to form the feature units of the coding unit.

In an embodiment, the width of the start code is smaller than the width of any feature code, which reduces an overall width of the coding unit, enables more coding units to be arranged within the full-stroke range of the piston rod 530, and improves the identification accuracy of the position of the coding unit.

In an embodiment, referring to FIG. 3, four barcodes are used as one coding unit, including one start code 210, and other three barcodes as the feature codes 211. The three feature codes 211 constitute the feature units of the coding unit.

The start code 210 is the same within the full-stroke range of the piston rod 530, and each of the feature codes 211 is unique within the full-stroke range of the piston rod 530. The start code 210 and each of the different feature codes 211 guarantee that there is no duplication of coding units within the full-stroke range.

For example, in reality, five barcodes with different widths of 0.2 mm, 0.8 mm, 1.2 mm, 1.6 mm, and 2.0 mm are etched along the circumference of the piston rod 530 during the full-stroke, and four barcodes constitute one coding unit.

The barcode with the width of 0.2 mm is used as the start code 210 of the coding unit, and the other three feature codes 211 are freely combined with four widths of 0.8 mm, 1.2 mm, 1.6 mm, and 2.0 mm. A spacing between any barcodes is 3 mm.

The combination form of any coding unit is different throughout the full-stroke of the piston rod 530, thereby forming the piston rod 530 in which any coding unit has the unique feature information.

When identifying the coding unit, the coding unit can be identified by including 2x−1 barcodes in the target image 620, and x is the number of barcodes contained in one coding unit.

The feature is extracted on the piston rod 530 in the coding method 1, the coding feature database corresponding to the piston rod 530 is established, and the position of the piston rod 530 is detected using the above position detection method. The coding method 1 requires fewer types of coding and simple coding rules.

Coding method 2: A plurality of coding units are provided in the moving direction of the piston rod 530. A plurality of feature codes are spaced apart along the moving direction of the piston rod 530. Each of the coding units includes a same number of the feature codes starting from any feature code and distributed in the target direction.

Figure 4:
FIG. 4 is a schematic view of a second coding scheme of the method for detecting the position of the piston rod according to an embodiment of the present application.

In an embodiment, as shown in FIG. 4, a plurality of barcodes with different thicknesses are provided on the surface of the piston rod 530, and four barcodes are used as one coding unit.

The first to fourth barcodes are the starting point coding unit 220, the second to fifth barcodes are the second coding unit 221, and so on. The coding unit composed of every four barcodes is unique.

In the plurality of coding units encoded in coding method 2, the last 4 barcodes are ending point coding units 222.

It can be understood that in the coding method 2, x codes are used as one coding unit, and the last X codes are the ending point coding units 222.

Extracting the feature on the piston rod 530 in the coding method 2, and establishing the coding feature database corresponding to the piston rod 530. When using the above position detection method to detect the position of the piston rod 530, it is only necessary to read more than one coding unit. The target image 620 can identify the information of the coding unit, and can also reduce the amount of pixel comparison between the target image 620 and the target coding feature segment, and improve the comparison speed.

In an embodiment, when the requirement of the detection accuracy of the position of the piston rod 530 is not high, identifying the position information of the corresponding target coding unit in the coding feature database can represent the currently detected position information of the piston rod 530.

The above two coding methods can be applied to the piston rod 530 of the telescopic hydraulic cylinder and the rotary hydraulic cylinder. A plurality of different coding units can be provided on the piston rod 530 to meet the actual detection accuracy requirements and improve detection efficiency and accuracy of the position of the piston rod 530.

The device for detecting the position of the piston rod provided by the present application is described below. The device for detecting the position of the piston rod described below and the device for detecting the position of the piston rod method described above can be mutually referenced.

Figure 7:
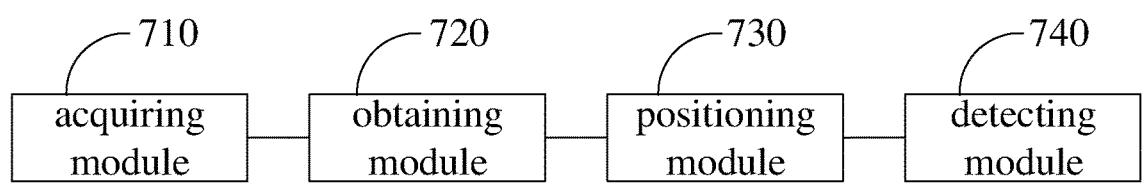
FIG. 7 is a schematic structural view of a device for detecting a position of a piston rod according to an embodiment of the present application.

As shown in FIG. 7, the present application provides a device for detecting a position of a piston rod 530, the piston rod 530 is movably installed on the cylinder body, and the position detection device includes: an acquiring module 710, an obtaining module 720, a positioning module 730 and a detecting module 740.

The acquiring module 710 is configured to acquire the target image 620 at the target position 610.

The obtaining module 720 is configured to obtain the pixel information corresponding to the target image 620.

The positioning module 730 is configured to compare the pixel information with the pixel database of the piston rod, the full-stroke pixel information 200 of the piston rod 530 and the corresponding relationship between the full-stroke pixel information 200 of the piston rod 530 and the displacement of the piston rod 530 being stored in the pixel database of the piston rod, and the full-stroke pixel information 200 at least including the pixel information within the movable range of the piston rod 530 relative to the target position 610.

The detecting module 740 is configured to determine the position information of the piston rod 530 based on the comparison results.

The device for detecting the position of the piston rod provided by the present application acquires the target image when the piston rod is at the target position, compares the pixel information of the target image with the pixel database of the piston rod, and determines the position information of the piston rod. The accurate comparison of the target image and the database pixel information of the piston rod pixel improves the detection accuracy of the position of the piston rod and realizes the detection of the absolute displacement of the piston rod.

In an embodiment, the piston rod 530 is provided with a plurality of coding units along the moving direction. The plurality of coding units are sequentially arranged on the piston rod 530, and are different from each other. The target image 620 includes at least one coding unit on the piston rod 530.

The position detection device also includes a second acquiring module for determining the target coding feature segment from the coding feature database based on the coding unit of the target image 620. The coding feature database includes coding feature segments corresponding to all coding units on the piston rod, and each of the coding feature segments in the coding feature database is mapped to the pixel information of the pixel database of the piston rod; and the corresponding target pixel information in the pixel database of the piston rod is obtained based on the target coding feature segment.

In an embodiment, the positioning module 730 is also configured to compare the pixel information corresponding to the target image with the target pixel information and the pixel information on at least one side of the target pixel information.

In an embodiment, the second acquiring module is also configured to: identify the coding unit of the target image; search for, based on the coding unit of the target image, the first coding unit corresponding to the coding unit of the target image from the coding feature database; determine the target coding feature segment based on the position of the first coding unit on the coding feature database.

In an embodiment, the second acquiring module determines the target coding feature segment including the target interval corresponding to the target coding feature segment, and supplementary intervals located on both sides of the target interval.

In the position detection device, the plurality of coding units provided along the moving direction of the piston rod 530 can have a plurality of coding methods.

Two different coding methods are described below.

Coding method 1: A plurality of coding units are provided in the moving direction of the piston rod 530, two adjacent coding units are spaced apart along the moving direction of the piston rod 530, each of the coding units includes a same start code 210 and a same number of feature codes 211.

Coding method 2: A plurality of coding units are provided in the moving direction of the piston rod 530. A plurality of feature codes are spaced apart along the moving direction of the piston rod 530. Each of the coding units includes a same number of the feature codes starting from any feature code and distributed in the target direction.

The present application also provides a hydraulic cylinder, including: a cylinder body, a piston rod 530 movably installed in the cylinder body, and the position detection device.

Taking a telescopic hydraulic cylinder as an example, the position detection process of the piston rod 530 of the hydraulic cylinder provided by the present application is described below with reference to FIG. 3, FIG. 5 and FIG. 6.

A plurality of coding units are provided on the piston rod 530 of the telescopic hydraulic cylinder in the coding method 1.

As shown in FIG. 6, the telescopic hydraulic cylinder includes: a cylinder body, the cylinder including a cylinder main body 510 and a cylinder cover 520; and a piston rod 530 movably installed in the cylinder body.

The piston rod 530 is provided with a plurality of coding units along the direction of movement. The plurality of coding units are arranged in sequence on the piston rod 530. The feature codes 211 of any two coding units are different.

The coding units on the piston rod 530 correspond to the positions of the piston rod 530. Each of the coding units represents the corresponding position information on the piston rod 530, and each of the coding units is unique.

The feature codes 211 of any two coding units are different, and through the identification of the feature codes 211, the corresponding coding unit can be identified.

The shape, the type and the number of the feature codes 211 in the plurality of coding units can be adjusted according to the shape of the piston rod 530 and detection requirements.

The shape of the feature code contained in the coding unit may be a strip, a triangle, a pentagon or other feature shapes.

The coding unit on the piston rod 530 corresponds to the position of the piston rod 530. The feature code 211 corresponds to each of the coding units. The coding unit represents the corresponding position information on the piston rod 530. Each of the coding unit contains different feature codes 211 and has the uniqueness.

A plurality of coding units are provided in the moving direction of the piston rod 530. Two adjacent coding units are spaced apart along the moving direction of the piston rod 530. Each of the coding units includes the same start code 210 and the same number of feature codes 211.

The same start code 210 is configured to quickly identify the coding unit. The start code 210 is followed by the feature code 211 of the coding unit, and the start code 210 is the starting point of the coding unit.

The same number of feature codes 211 constitute the feature unit of each of the coding units. The piston rod 530 is provided with a plurality of coding units along the moving direction. The feature codes 211 of any two coding units are different. Through the identification of the feature codes 211, the corresponding coding units can be identified.

The same number of feature codes 211 makes the coding units on the piston rod 530 more regular, which is beneficial to the identification of the coding units.

The shapes of the start code 210 and the feature code 211 in the plurality of coding units may be long strips. In other words, the start code 210 and the feature code 211 are barcodes.

The barcode may be etched on the surface of the piston rod 530, or may be pasted on the surface of the piston rod 530.

Whether any two of the feature codes are different is determined by comparing at least two of the order of barcodes, the barcode width, the barcode length, and the spacing between adjacent barcodes.

Each coding unit can include a plurality of barcodes, and by designing different barcode widths, the uniqueness of the corresponding position of the coding unit can be achieved.

In an embodiment, the surface of the piston rod 530 is provided with the plurality of barcodes with different widths, and the plurality of barcodes constitute a plurality of coding units, thus forming the plurality of coding units within the full-stroke range of the piston rod 530.

One fixed-width barcode is used as the start code 210 of the coding unit, and a plurality of feature codes 211 with other widths are freely arranged to form the feature units of the coding unit.

In an embodiment, the width of the start code is smaller than the width of any feature code, which reduces an overall width of the coding unit, enables more coding units to be arranged within the full-stroke range of the piston rod 530, and improves the identification accuracy of the position of the coding unit.

In an embodiment, referring to FIG. 3, four barcodes are used as one coding unit, including one start code 210, and other three barcodes as the feature codes 211. The three feature codes 211 constitute the feature units of the coding unit.

The start code 210 is the same within the full-stroke range of the piston rod 530, and each of the feature codes 211 is unique within the full-stroke range of the piston rod 530. The start code 210 and each of the different feature codes 211 guarantee that there is no duplication of coding units within the full-stroke range.

For example, in reality, five barcodes with different widths of 0.2 mm, 0.8 mm, 1.2 mm, 1.6 mm, and 2.0 mm are etched along the circumference of the piston rod 530 during the full-stroke, and four barcodes constitute one coding unit.

The barcode with the width of 0.2 mm is used as the start code 210 of the coding unit, and the other three feature codes 211 are freely combined with four widths of 0.8 mm, 1.2 mm, 1.6 mm, and 2.0 mm. A spacing between any barcodes is 3 mm.

The two feature codes 211 of any coding unit are different throughout the full-stroke of the piston rod 530, thus forming the piston rod 530 in which any coding unit has the unique feature information.

In an embodiment, the cylinder body is provided with an opening facing the coding unit, the hydraulic cylinder further includes an image acquisition device installed at the opening, the opening is the target position 610, and at least one coding unit is captured by the image acquisition device.

As shown in FIG. 5, the image acquisition device includes: a lens hood 570, a camera 550, a light uniformity plate 560, etc.

The lens hood 570 is installed in the opening and interference-fits with the opening, and is provided with a window facing the coding unit.

The camera 550 is installed in the lens hood 570 and is directly opposite the window, and is configured to capture the target image 620 on the piston rod 530.

The light uniformity plate 560 is installed in the lens hood 570 and is located on a side of the camera 550 away from the window.

The opening is relatively stationary to the cylinder body, and the image acquisition device acquires an image on the piston rod 530 at the opening, that is, the target image 620.

During the movement of the piston rod 530, when it reaches different displacements, the target image 620 exposed in the opening is different. The acquired target image 620 includes at least one coding unit on the piston rod 530.

In an embodiment, the hydraulic cylinder further includes a processor 590 electrically connected to the image acquisition device and is configured to determine the position information of the piston rod 530 based on the target image 620 collected by the image acquisition device and the pre-stored pixel database of the piston rod.

The full-stroke pixel information of the piston rod 530 and the corresponding relationship between the full-stroke pixel information of the piston rod 530 and the displacement of the piston rod 530 are stored in the pixel database of the piston rod, and the full-stroke pixel information at least includes the pixel information within the range which the piston rod 530 can move relative to the target position 610.

The processor 590 is configured to: determine the target coding feature segment from the coding feature database based on the coding unit in the target image 620 collected by the image acquisition device, obtain the corresponding target pixel information in the pixel database of the piston rod based on the target coding feature segment, and determine the position information of the piston rod based on the pixel of the target image 620 and the pixel of the target pixel information.

The image acquisition device and the processor 590 constitute the position detection device of the piston rod 530, and execute the corresponding piston rod position detection method 530.

Firstly, the coding feature database and the pixel database of the piston rod are established, the image acquisition device performs the full-stroke high-frequency photography, image splicing, binarization processing, and feature extraction on the piston rod 530 equipped with a plurality of coding units, and the coding feature database and the pixel database of the piston rod are established corresponding to the full-stroke coding and the full-stroke pixels and position information on the piston rod 530.

Then, the piston rod 530 moves, the camera 550 captures the target image 620 on the piston rod 530 at high frequency, the processor 590 identifies the target image 620, and identifies the coding unit on the target image 620.

According to the identification result, the corresponding coding unit is searched from the established coding feature database, the target coding feature segment is determined based on the position of the coding unit on the coding feature database, and the approximate position of the piston rod 530 is quickly determined.

Finally, the pixel information of the target image 620 is compared with the target pixel information corresponding to the target coding feature segment to obtain the accurate position of the piston rod 530, so as to achieve the absolute displacement detection.

As shown in FIG. 6, the image acquired by the window of the camera 550 at the target position 610 ensures that there is the complete coding unit within the view window at any time.

For example, when identifying the coding unit, the coding unit can be identified if the target image 620 includes 2x−1 barcodes, and x is the number of barcodes contained in one coding unit.

The hydraulic cylinder that is detected according to the method for detecting the position of the piston rod 530 in the present application obtains the identification coding unit from the target image 620 where the piston position is located, determines the target coding feature segment corresponding to the position of the piston rod 530 from the coding feature database, and compares the target image 620 with the target coding feature segment, so as to obtain the accurate position of the piston rod 530, and improve the detection efficiency and accuracy of the piston rod 530 position.

The present application also provides a working machine, including the position detection device of the hydraulic cylinder or piston rod 530.

The working machine may be a tower crane, a truck crane, an excavator, a pile driver, a concrete machinery, a road roller, a mixer truck, a tunnel boring machine, a pump truck or a fire truck and other working machine containing hydraulic cylinders.

Figure 8:
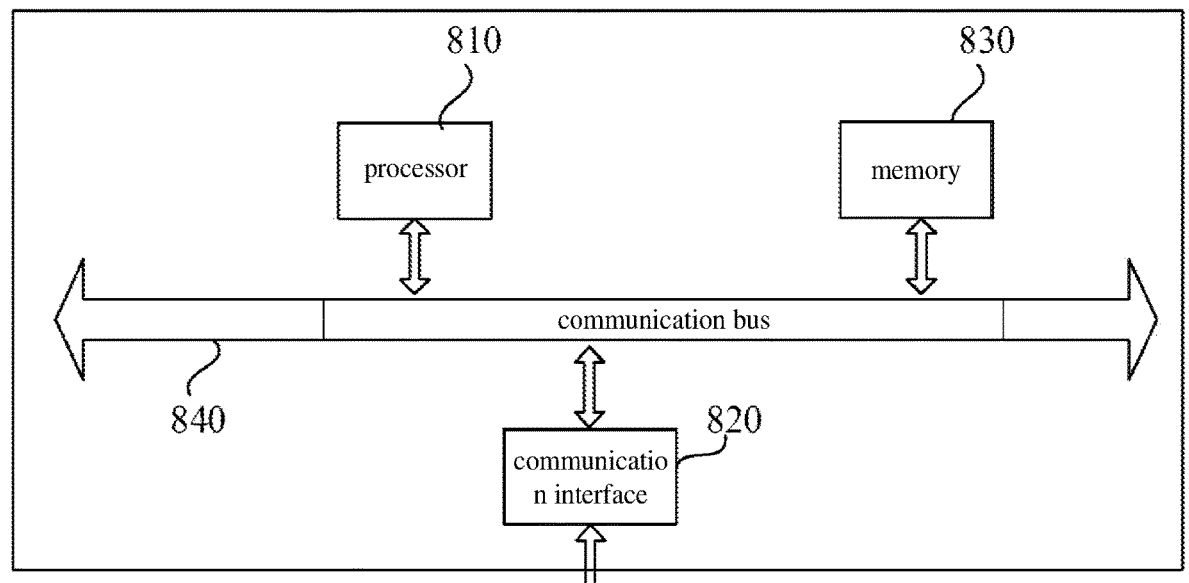
FIG. 8 is a schematic structural view of an electronic device according to an embodiment of the present application.

FIG. 8 illustrates a schematic structural view of an electronic device according to an embodiment of the present application. As shown in FIG. 8, the electronic device may include: a processor 810, a communication interface 820, a memory 830 and a communication bus 840. The processor 810, the communication interface 820, and the memory 830 communicate with each other through the communication bus 840. The processor 810 can call the logic instructions in the memory 830 to execute the method for detecting the position of the piston rod. The piston rod is movably installed on the cylinder body. The method includes: acquiring the target image at the target position; obtaining the pixel information corresponding to the target image; comparing the pixel information with the pixel database of the piston rod, the full-stroke pixel information of the piston rod and the correspondence between the full-stroke pixel information of the piston rod and the displacement of the piston rod being stored in the pixel database of the piston rod, the full-stroke pixel information at least including the pixel information within the range which the piston rod can move relative to the target position; determining the position information of the piston rod based on the comparison results.

In addition, the logical instructions in the memory 830 can be implemented in the form of software functional units and can be stored in a computer-readable storage medium when sold or used as an independent product. Based on this understanding, the technical solution of the present application essentially or the part that contributes to the related art or the part of the technical solution can be embodied in the form of a software product. The computer software product is stored in a storage medium, including several instructions are configured to cause a computer device (which may be a personal computer, a server, or a network device, etc.) to execute all or part of the steps of the methods described in various embodiments of the present application. The aforementioned storage media include: a U disk, a mobile hard disk, a read-only memory (ROM), a random access memory (RAM), a magnetic disk or an optical disk and other media that can store program code.

On the other hand, the present application also provides a computer program product, including a computer program stored on a non-transitory computer-readable storage medium. The computer program includes program instructions. When the program instructions are executed by the computer, the computer can execute the method for detecting the position of the piston rod provided by each of the above methods. The piston rod is movably installed in the cylinder body. The method includes: acquiring the target image at the target position; obtaining the pixel information corresponding to the target image; comparing the pixel information with the pixel database of the piston rod, the full-stroke pixel information of the piston rod and the correspondence between the full-stroke pixel information of the piston rod and the displacement of the piston rod being stored in the pixel database of the piston rod, the full-stroke pixel information at least including the pixel information within the range which the piston rod can move relative to the target position; determining the position information of the piston rod based on the comparison results.

In another aspect, the present application also provides a non-transitory computer-readable storage medium on which a computer program is stored, which is implemented when executed by a processor to perform the above-mentioned piston rod position detection method. The piston rod is movably installed in the cylinder body. The method includes: acquiring the target image at the target position; obtaining the pixel information corresponding to the target image; comparing the pixel information with the pixel database of the piston rod, the full-stroke pixel information of the piston rod and the correspondence between the full-stroke pixel information of the piston rod and the displacement of the piston rod being stored in the pixel database of the piston rod, the full-stroke pixel information at least including the pixel information within the range which the piston rod can move relative to the target position; determining the position information of the piston rod based on the comparison results.

The embodiments of the device described above are only illustrative. The units described as separate components may or may not be physically separated. The components shown as units may or may not be physical units, that is, they may be located in one place, or it can be distributed to a plurality of network units. Some or all of the modules can be selected according to actual needs to achieve the purpose of the solution of this embodiment. Those skilled in the art can understand and implement the method without any creative effort.

Through the above description of the embodiments, those skilled in the art can clearly understand that each embodiment can be implemented by software plus a necessary general hardware platform, and of course, it can also be implemented by hardware. Based on this understanding, the part of the above technical solution that essentially contributes to the related art can be embodied in the form of a software product. The computer software product can be stored in a computer-readable storage medium, such as ROM/RAM, magnetic disc, optical disk, etc., including a number of instructions to cause a computer device (which can be a personal computer, a server, or a network device, etc.) to execute various embodiments or methods of certain parts of the embodiments.

At last, it should be noted that: the above descriptions are only embodiments of the present application, and are not intended to limit the scope of the present application. Those skilled in the art should understand that they can still modify the technical solutions recorded in the embodiments, or make equivalent substitutions for some of the technical features. These modifications or substitutions do not make the essence of the corresponding technical solutions deviates from the spirit and scope of the technical solutions of each embodiment of the present application.

What is claimed is:

1. A method for detecting a position of a piston rod, wherein the piston rod is movably provided in a cylinder body, and the method comprises:
   acquiring a target image at a target position;
   obtaining a pixel information corresponding to the target image;
   comparing the pixel information with a pixel database of the piston rod, wherein a full-stroke pixel information of the piston rod and a relationship between the full-stroke pixel information of the piston rod and a displacement of the piston rod are stored in the pixel database of the piston rod, and the full-stroke pixel information at least comprises the pixel information within a range in which the piston rod is configured to move relative to the target position; and
   determining a position information of the piston rod based on a comparison result;
   wherein the piston rod is provided with a plurality of coding units along a moving direction, the plurality of the coding units are provided in sequence throughout the piston rod and are different from each other to form a full-stroke feature coding, and the target image comprises at least one coding unit on the piston rod; and
   before comparing the pixel information with the pixel database of the piston rod, the method further comprises:
   determining a target coding feature segment from a coding feature database based on the coding unit of the target image, wherein the coding feature database comprises coding feature segments corresponding to all the coding units on the piston rod, and each of the coding feature segments in the coding feature database is mapped to the pixel information of the pixel database of the piston rod; and
   obtaining a corresponding target pixel information in the pixel database of the piston rod based on the target coding feature segment.

2. The method for detecting the position of the piston rod of claim 1, wherein comparing the pixel information with the pixel database of the piston rod comprises:
   comparing the pixel information corresponding to the target image with the target pixel information and the pixel information on at least one side of both sides of the target pixel information.

3. The method for detecting the position of the piston rod of claim 1, wherein determining the target coding feature segment from the coding feature database based on the coding unit of the target image comprises:
   identifying a coding unit of the target image;
   searching a first coding unit corresponding to the coding unit of the target image from the coding feature database based on the coding unit of the target image; and
   determining the target coding feature segment based on a position of the first coding unit on the coding feature database.

4. The method for detecting the position of the piston rod of claim 3, wherein the target coding feature segment comprises a target interval corresponding to the target coding feature segment and supplementary intervals located on both sides of the target interval.

5. The method for detecting the position of the piston rod of claim 1, wherein two adjacent coding units are spaced apart along the moving direction of the piston rod, and each of the coding units comprises a same start code and a same number of feature codes.

6. The method for detecting the position of the piston rod of claim 1, wherein a plurality of feature codes are spaced apart along the moving direction of the piston rod, and each of the coding units comprises a same number of feature codes starting from any one feature code and distributed towards a target direction.

7. An electronic device, comprising a memory, a processor and a computer program stored on the memory and executable on the processor, wherein when the program is executed by the processor, the method for detecting the position of the piston rod of claim 1 is implemented.

8. A device for detecting a position of a piston rod, comprising:

an acquiring module configured to acquire a target image at a target position;

an obtaining module configured to obtain a pixel information corresponding to the target image;

a positioning module configured to compare the pixel information with a pixel database of the piston rod, wherein a full-stroke pixel information of the piston rod, a corresponding relationship between the full-stroke pixel information of the piston rod and a displacement of the piston rod are stored in the pixel database of the piston rod, and the full-stroke pixel information at least comprises the pixel information within a range in which the piston rod can move relative to the target position; and a detecting module configured to determine a position information of the piston rod based on a comparison result;

wherein the piston rod is provided with a plurality of coding units along a moving direction, the plurality of the coding units are provided in sequence throughout the piston rod and are different from each other to form a full-stroke feature coding, and the target image comprises at least one coding unit on the piston rod; and before comparing the pixel information with the pixel database of the piston rod, the method further comprises:

determining a target coding feature segment from a coding feature database based on the coding unit of the target image, wherein the coding feature database comprises coding feature segments corresponding to all the coding units on the piston rod, and each of the coding feature segments in the coding feature database is mapped to the pixel information of the pixel database of the piston rod; and obtaining a corresponding target pixel information in the pixel database of the piston rod based on the target coding feature segment.

9. The device for detecting the position of the piston rod of claim 8, wherein the piston rod is provided with a plurality of coding units along a moving direction, and the plurality of the coding units are provided in sequence on the piston rod and are different from each other, and the target image comprises at least one coding unit on the piston rod; and the device further comprises a second acquiring module configured to determine a target coding feature segment from a coding feature database based on the coding unit of the target image, wherein the coding feature database comprises the coding feature segment corresponding to all the coding units on the piston rod, and each of the coding feature segments in the coding feature database is mapped to the pixel information of the pixel database of the piston rod; and the second acquiring module is configured to obtain a corresponding target pixel information in the pixel database of the piston rod based on the target coding feature segment.

* * * * *